Dec. 18, 1962 C. W. SKELTON 3,069,557
FUNCTION GENERATOR UTILIZING NON-CONDUCTING SIDE OF A BINARY CHAIN
Filed June 6, 1957
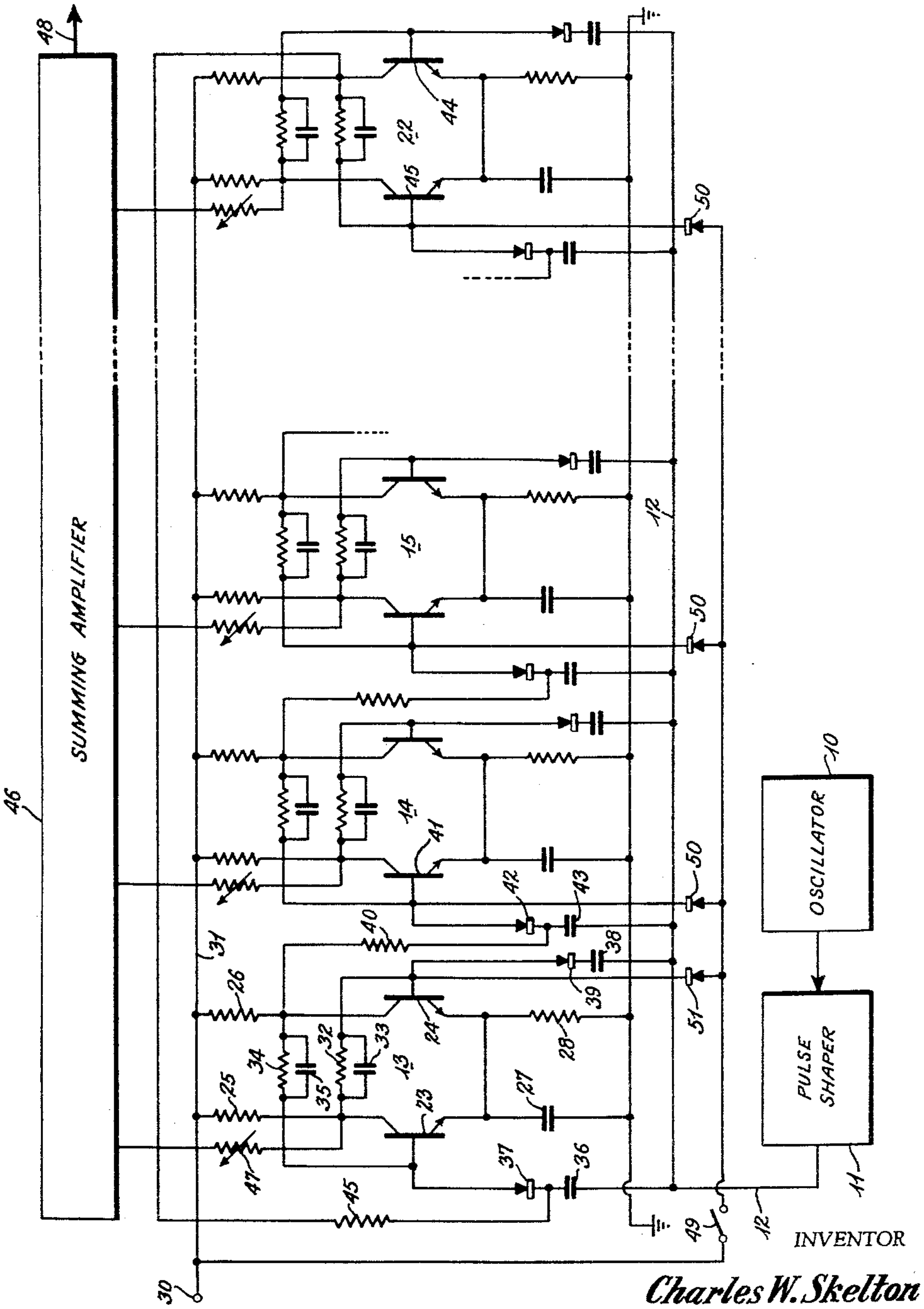
INVENTOR
Charles W. Skelton
BY Stevens, Davis, Miller & Mosher
ATTORNEYS United States Patent Office 3,069,557
Patented Dec. 18, 1962

3,069,557
FUNCTION GENERATOR UTILIZING NON-CONDUCTING SIDE OF A BINARY CHAIN

Charles W. Skelton, Irving, Tex., assignor to Texas Instruments Incorporated, Dallas, Tex., a corporation of Delaware Filed June 6, 1957, Ser. No. 664,139
6 Claims. (Cl. 307—88.5)

This invention relates to an apparatus for accurately generating functions for input to analogue computers. The device comprises a cascade of transistor flip-flop circuits connected as a shift register driven by a suitable generating circuit. The voltage output from each transistor flip-flop is fed to a summing amplifier over a variable resistor. Then any desirable function can be approximately synthesized by the proper selection of the values of the variable resistors.

Prior to the applicant's invention, a common way of generating a function for use in an analogue computer was to utilize a delay line with a plurality of taps along the length of the delay line. A series of pulses is then fed into the delay line. The combination of outputs from the plurality of taps, the magnitude from each output tap being selected, resulted in the approximation of the desired function. The function is repeated each time a pulse is applied to the delay line. This device has a disadvantage however, in that the pulse is attenuated as it travels along the delay line and this attenuation must be compensated. This problem becomes more severe the longer the delay line. Furthermore, the delay line must be of practical length and accordingly the device only renders itself applicable to synthesizing functions having a very short time period. If it is desired to synthesize a function having a long time period, then it would be necessary to use an extremely long delay line which would be very expensive. The applicant's invention overcomes these problems. The cyclic rate of the pulses applied can be varied to change the time period and cycle of the function generated. Such a variation was impossible with the use of the delay line. The same length of function would always be generated regardless of the rate at which pulses are applied to the delay line. Changing the rate at which pulses are applied to the delay line will only vary the repetitive rate at which the function is regenerated but the actual time duration of the function will not vary. This is a considerable disadvantage in that it makes the use of the delay line function generator inflexible.

The objects and the advantages of the applicant's invention can be better understood with reference to the drawing wherein there is shown a circuit diagram of the applicant's invention.

Referring now to the figure the oscillator 10 generates an alternating signal which is fed to the pulse shaper 11. The pulse shaper 11 converts the alternating signal into a square wave signal. The oscillator and pulse shaper may be of the type as was fully described in the copending application Serial No. 623,385 of Skelton et al., filed on November 20, 1956, now Patent No. 2,970,226. The square wave output from the pulse shaper is fed to a transistor flip-flop shift register over line 12. This shift register is similar to the shift register described in the copending application Serial No. 650,786 of Skelton et al., filed on April 4, 1957, now Patent No. 2,899,572. Each succeeding flip-flop is gated by the preceding flip-flop and the first flip-flop is gated by the last flip-flop in the chain. Each flip-flop of the chain is actuated from one stable state to the other and back again in sequence. Each succeeding flip-flop is switched from the first state to the second at the same time that the preceding flip-flop is switched back again from the second state to the first. This action produces square wave output pulses from each flip-flop. These square wave pulses are produced in sequence with the leading edge of each succeeding pulse coinciding with the trailing edge of each preceding pulse. The output pulses are combined in the summing amplifier 46 which functions as an "or" circuit. The output pulses applied to the summing amplifier can each be varied in magnitude. Any function can be approximately synthesized at the output 48 of the summing amplifier 46 by the selective variation of the magnitudes of the output pulses from the shift register.

The shift register shown in the figure is represented as having 10 flip-flop stages or circuits 13 through 22. Only the first three stages 13, 14 and 15 and the last stage 22 are shown in detail. The flip-flops 16 through 21, which are not shown, are connected between the flip-flops 15 and 22 and are exactly like the flip-flop 15.

D.C. voltage is applied to the shift register from the terminal 30 over line 31. The first flip-flop 13 of the shift register comprises a left hand transistor 23 and a right hand transistor 24. The collectors of the transistors 23 and 24 are connected to the D.C. voltage on line 31 over resistors 25 and 26, respectively. The emitters of the transistors 23 and 24 are connected together and to ground over the parallel circuit of the capacitor 27 and the resistor 28. The collector of the transistor 23 is connected to the base of the transistor 24 by the parallel circuit of the resistor 32 and the capacitor 33. The collector of the transistor 24 is connected to the base of the transistor 23 by means of a parallel circuit comprising the resistor 34 and the capacitor 35.

Each of the flip-flop stages 14 through 22 comprises a left hand transistor and a right hand transistor connected in the same way as described above with reference to the flip-flop stage 13.

The flip-flop circuit 13–22 has two stable states. One stable state is with the left hand transistor conducting and the right hand transistor non-conducting. This condition shall be called state A. The other stable state is with the right hand transistor conducting and the left hand transistor non-conducting. This condition shall be called state B. When the flip-flop 13 is in state B, the transistor 23 is non-conducting and a high voltage will result at the collector of the transistor 23. This high voltage will be transmitted to the base of the transistor 24 over the resistor 32. The high voltage on the base of the transistor 24 maintains this transistor in a conducting state, and as a result, the collector of the transistor 24 will be at a low voltage. This low voltage is transmitted by means of resistor 34 to the base of the transistor 23 and the low voltage applied to this base maintains the transistor 23 in a non-conducting state. Thus, the flip-flop 13 will remain in state B until some external agent causes it to switch to the opposite state. Likewise, when the stage 13 is in state A, the transistor 24 is non-conducting and the collector of the transistor 24 will be in a high voltage and will maintain the base of the transistor 23 correspondingly at a high voltage over the resistor 34. Thus, the transistor 23 will be maintained conducting and the collector of the transistor 23 will be at a low voltage which will be transmitted to the base of the transistor 24 over the resistor 32, thus maintaining the transistor 24 in a non-conducting state. The flip-flop 13 will remain in state A until an external agent causes the flip-flop to switch to the opposite state. The remaining flip-flops 14 through 22, likewise will remain in the state in which they are until an external agent causes them to switch to the opposite state.

The flip-flops 13 through 22 can be switched from one state to the other by means of a square wave voltage on line 12. For example, with reference to the flip-flop 13, the line 12 is connected to the base of the transistor 23 over the capacitor 36 and the rectifier 37. The line 12 is also connected to the base of the transistor 24 over the capacitor 38 in the rectifier 39. The capacitors 36 and 38 differentiate the square wave on line 12 into positive and negative spikes. The rectifiers 37 and 39 only pass the negative spikes to the bases of the transistors 23 and 24. Presuming that the flip-flop 13 is in state B, then the negative pulse supplied to the base of the transistor 23 will have no effect as this transistor is already not conducting. However, the negative pulse applied to the base of the transistor 24 will sharply reduce the conduction of this transistor. This action will cause a rise in the potential of the collector of the transistor 24. The increased in voltage is passed to the base of transistor 23 through the coupling resistor 34 and capacitor 35. The increase in voltage at the base of the transistor 23 will start conduction through this transistor and result in a decrease in voltage at the collector of this transistor. This decrease is passed to the base of the transistor 24 through the coupling resistor 32 and capacitor 33. The voltage decrease at the base of the transistor 24 will still cause a further lessening of current flow through the transistor 24 and a further rise in potential at the collector of this transistor. This action is cumulative and continues until the flip-flop has switched from state B to state A wherein the transistor 23 conducts and the transistor 24 is cut off. This switching of states of the flip-flop occurs so rapidly as to be almost instantaneous. The flip-flop can also be switched from state A to the state B. The process occurs in exactly the same manner as the switch from state B to A only in reverse with a negative pulse differentiated by the capacitor 36 applied to the base of transistor 23 initially reducing the current through this transistor. In a like manner, all of the other flip-flops 14 through 22 are switched from one state to the other by the square wave voltage on the line 12. This square wave voltage will cause the flip-flops to switch when it goes from a high value to a low value resulting in a negative pulse being differentiated by one of the capacitors connected to line 12. However, the flip-flops are prevented from being switched from the state A to state B whenever the preceding flip-flop is in state A. Also, the flip-flop 13 is prevented from switching from state A to state B when the last flip-flop 22 is in state A. This operation is done by a gating connection between the flip-flops. The flip-flop 13 gates the flip-flop 14 by means of a resistor 40 which is connected from the collector of the transistor 24 of the flip-flop 13 to a point between the capacitor 43 and the rectifier 42 which comprise the input from line 12 to the left hand transistor 41 of the flip-flop 14. The flip-flop 13 places a high reverse bias on the rectifier 42 over resistor 40 whenever the flip-flop 13 is in state A. This reverse bias will present the passage of negative spikes differentiated by the capacitor 38 to the base of the right hand transistor 41 of the flip-flop 14. Hence, the flip-flop 14 cannot switch from state A to state B whenever the flip-flop 13 is in state A. There is a gating resistor connected between the flip-flop 14 and the flip-flop 15 in exactly the same manner as the resistor 40 is connected between the flip-flop 13 and the flip-flop 14. The flip-flop 16 is connected to the flip-flop 15 exactly like the flip-flop 15 is connected to the flip-flop 14 and would merely be continued from where the dotted line leaves off in the same manner in which the flip-flop 15 is continued from the flip-flop 14. Likewise, the flip-flops 17 through 21 would be continued each from the preceding flip-flop, and the flip-flop 21 would connect to the flip-flop 22 in the same manner in which the flip-flop 14 connects to the flip-flop 15. In this manner, each succeeding transistor flip-flop is gated by the preceding transistor flip-flop and each succeeding flip-flop will not switch from state A to state B whenever the preceding flip-flop is in state A. The collector of the right hand transistor 44 of the flip-flop 22, which is the last flip-flop in the chain, is connected over the resistor 45 to a point between the capacitor 36 and the rectifier 37 of the input to the left hand transistor 23 of the flip-flop 13. In this manner, the flip-flop 22 gates the flip-flop 13 and the flip-flop 13 will not switch from state A to state B whenever the flip-flop 22 is in state A. With the flip-flops connected in this manner, each flip-flop will be actuated in order. That is, first the flip-flop 13 will switch from state A to state B and then back again, whereupon the flip-flop 14 will switch from state A to state B and then back again and then the flip-flop 15 will switch from state A to state B and back again and so on up to the flip-flop 22, which in turn flips from state A to state B and then back again and then the flip-flop 13 will again be actuated and the process will continue as long as the square wave pulses are applied to line 12.

Let it be presumed for purposes of explanation that the flip-flop 13 is in state B and the flip-flops 14 through 22 are in state A. When the square wave voltage on line 12 changes from a high value to a low value, the flip-flops 15 through 22 will be unaffected as the preceding flip-flops will all be in state A. However, the flip-flop 13 is in state B and thus the flip-flop 14 does not have a high potential reverse bias applied to the rectifier 42. Thus the flip-flop 14 will switch from state A to state B. The flip-flop 13 already being in state B will switch back to state A as there is no gating potential applied to the input rectifier of the right hand transistor of each of the flip-flops. In a similar manner, the flip-flop 15 will switch from state A to state B and the flip-flop 14 will switch back from state B to state A when the square wave voltage on line 12 again changes from a high value to a low value. The remaining flip-flops will remain in state A. This action will continue with each succeeding flip-flop being actuated in turn until the flip-flop 22 is switched from state A to state B. When the square wave on line 12 again changes from a high value to a low value, the flip-flop 22 will switch back from state B to state A and the flip-flop 13 will be actuated to go from state A to state B. The operation then repeats itself and will continue with each flip-flop being actuated in order.

The output from the collector of the left hand transistor 23 of the flip-flop 13 is connected to a summing amplifier 46 over a variable resistor 47. Each of the flip-flops 14 through 22 is also connected to the summing amplifier 46 by a variable resistor in the same manner. The summing amplifier will then receive a square wave pulse over the variable resistor from each stage of the shift register as each stage is actuated in order. The summing amplifier 46 functions as a combining circuit and produces at its output 48 a voltage which is a function of the input voltages applied from the shift register. Actually, the summing amplifier 46 adds the total of the input voltages applied from each of the flip-flops but since at any given time only one of the flip-flops has a high voltage applied to the summing amplifier, the summing amplifier in effect acts only as an "or" network which transfers and amplifies the output from the single flip-flop which is in state B as the outputs from the remaining flip-flops are low and have a negligible effect. The output from the summing amplifier at 48 will change in steps to be proportional at all times to the output from whatever stage is in state B. During the first period, it will be a voltage which is proportional to the output voltage from the first flip-flop 13. Then during the next period, it will be a voltage proportional to the output voltage from the flip-flop 14. During the third period there will be an output voltage proportional to the output from the flip-flop 15 and so on. The magnitude of voltage applied to the summing amplifier from each flip-flop can be varied by changing the values of the variable resistors. Thus by the proper selection of values, any function can be approximately synthesized and produced at the output 48 of the summing amplifier 46.

In order for the shift register to operate properly, it is necessary for one of the flip-flops to be in state B and the rest of the flip-flops must be in state A. The shift register of flip-flops is set in this condition by momentarily closing the switch 49 which operates as a clear switch. This switch will apply a positive potential from the terminal 30 to the bases of the left hand transistor of all the flip-flops 14 through 22 over rectifiers 50, thus causing these flip-flops to assume the state A. A positive potential is also applied to the right hand transistor 24 of the flip-flop 13 over rectifier 51, thus causing the flip-flop 13 to assume state B. Thus, by the closure of the switch 49, the shift register is set so that the first flip-flop 13 is in state B and the remaining flip-flops 14 through 22 are in state A and the flip-flop chain is then ready for operation.

By varying the frequency of the pulses applied from the oscillator 10 and the pulse shaper 11, the rate at which the function is reproduced and the length of the function in time can be varied. The shift register has been shown as having ten stages. However, it is obvious that the number of stages can be decreased or increased as desired. The use of more stages will result in a better approximation of the function which is being synthesized.

It is understood that the above description and drawing is for purposes of giving the specific embodiment of the invention and is not intended to limit the invention. For example, instead of transistors, it is contemplated that vacuum tubes can be used for the flip-flop stages of the shift register and also instead of a summing amplifier 46, a simple combining circuit such as an "or" network with an ordinary amplifier could be used. These and other modifications are considered to be within the spirit and scope of this invention which is to be limited only as defined in the appended claims.

What is claimed is:

1. A function generator comprising:

(*a*) a first and second series of three terminal switching elements including input and output terminals, (*b*) each element of said first series being cross-coupled with an element of said second series to define a bistable flip-flop stage with one of the elements normally conducting and the other element normally nonconducting, (*c*) said flip-flop stages being arranged serially, (*d*) a summing amplifier, (*e*) means including a variable resistor interconnecting the output of each element of said first series with said summing amplifier, (*f*) an input circuit connected to the input terminal of each element including in series a capacitor and a rectifier having a polarity to pass negative pulses only to said input terminals, (*g*) square wave generator means connected in common to all said input circuits, (*h*) means including a resistor interconnecting the output terminal of each element of the second series with the input circuit connected to the input terminal of the element of the first series of the next succeeding stage with the last stage being so interconnected with the first stage to form a ring circuit, said interconnection with said input circuit being at a point between said capacitor and rectifier thereof, and (*i*) means connecting the output terminals of said elements with a source of positive reference potential.

2. A function generator like claim 1 further including reset means to set all flip-flop stages except one with the element of the first series conducting and said one with the element of the second series conducting.

3. A function generator like claim 2 wherein said reset means comprises rectifier means connected in one stage to pass positive voltage to the input terminal of the element of said second series and in all other stages connected to pass positive voltage to the input terminal of the element of said first series, and means including a switch connected to a source of positive voltage for applying same to said rectifier means.

4. A function generator comprising:

(*a*) a first and second series of transistors having base, collector and emitter electrodes, the base and collector electrodes of each transistor of said first series and a transistor of the second series being cross-coupled to define a bistable flip-flop stage with one of the transistors normally conducting and the other transistor normally nonconducting, (*b*) said flip-flop stages being arranged serially, (*c*) a summing amplifier, (*d*) an output circuit including a variable resistor interconnecting the collector electrode of each transistor of said first series with said summing amplifier, (*e*) an input circuit connected to the base electrode of each transistor including in series a capacitor and a rectifier having a polarity to pass negative pulses only, (*f*) square wave generator means connected in common to all said input circuits, (*g*) means including a resistor interconnecting the collector electrode of each transistor of the second series with the input circuit connected to the base electrode of the transistor of the first series of the next succeeding stage with the last stage being so interconnected with the first stage to form a ring circuit, said interconnection with said input circuit being at a point between said capacitor and rectifier thereof, (*h*) means connecting the collector electrodes of said transistors with a source of positive reference potential, (*i*) and means connecting the emitter electrodes of said transistors to a reference potential.

5. A function generator like claim 4 further including reset means to set all flip-flop stages except one with the transistor of the first series conducting and said one with the transistor of the second series conducting.

6. A function generator like claim 5 wherein said reset means comprises rectifier means connected in one stage to pass positive voltage to the base electrode of the transistor of said second series and in all other stages connected to the base electrode of the transistor of said first series, and means including a switch connected to a source of positive voltage for applying same to said rectifier means.

References Cited in the file of this patent

UNITED STATES PATENTS

| | | |
|---|---|---|
| 2,136,621 | King et al. | Nov. 15, 1938 |
| 2,574,145 | Freas | Nov. 6, 1951 |
| 2,678,425 | Hoeppner | May 11, 1954 |
| 2,724,104 | Wild | Nov. 15, 1955 |
| 2,731,631 | Spaulding | Jan. 17, 1956 |
| 2,749,437 | Parr | June 5, 1956 |
| 2,764,343 | Diener | Sept. 25, 1956 |
| 2,765,403 | Loper et al. | Oct. 2, 1956 |
| 2,803,815 | Wulfsberg | Aug. 20, 1957 |
| 2,823,856 | Booth et al. | Feb. 18, 1958 |
| 2,896,092 | Pugsley | July 21, 1959 |
| 2,899,572 | Skelton | Aug. 11, 1959 |
| 2,920,217 | House | Jan. 5, 1960 |